United States Patent
Rodriguez et al.

(10) Patent No.: US 9,581,354 B2
(45) Date of Patent: Feb. 28, 2017

(54) RELIEF VALVE

(71) Applicant: Conbraco Industries, Inc., Matthews, NC (US)

(72) Inventors: Bertito Tubo Rodriguez, Charlotte, NC (US); Gregory Dean Goodson, Charlotte, NC (US)

(73) Assignee: Conbraco Industries, Inc., Matthews, NC (US)

( * ) Notice: Subject to any disclaimer, the term of this patent is extended or adjusted under 35 U.S.C. 154(b) by 120 days.

(21) Appl. No.: 14/620,845

(22) Filed: Feb. 12, 2015

(65) Prior Publication Data

US 2016/0238138 A1    Aug. 18, 2016

(51) Int. Cl.
| F16K 15/00 | (2006.01) |
| F24H 1/18 | (2006.01) |
| F16K 17/04 | (2006.01) |
| F24H 9/20 | (2006.01) |
| F16K 27/06 | (2006.01) |

(52) U.S. Cl.
CPC ........... *F24H 1/188* (2013.01); *F16K 17/0406* (2013.01); *F16K 17/048* (2013.01); *F16K 27/067* (2013.01); *F24H 9/2007* (2013.01); *Y10T 137/7928* (2015.04); *Y10T 137/7936* (2015.04)

(58) Field of Classification Search
CPC .. F16K 15/044; F16K 15/048; F16K 17/0406; Y10T 137/7922; Y10T 137/7929; Y10T 137/7927; Y10T 137/7928; Y10T 137/7936; Y10T 137/7937
See application file for complete search history.

(56) References Cited

U.S. PATENT DOCUMENTS

| 543,773 | A | * | 7/1895 | Massey | ................ B01D 35/043 137/523 |
| 2,896,663 | A | * | 7/1959 | Mena | .................... F16K 15/044 137/539 |
| 4,084,304 | A | * | 4/1978 | Myers | ................... B23P 15/001 137/539 |
| 4,310,018 | A | * | 1/1982 | Parr | ...................... F16K 15/044 137/539.5 |
| 4,930,553 | A | | 6/1990 | Grillo | |
| 2009/0056817 | A1 | * | 3/2009 | Almaraz | ............... F02M 69/465 137/505 |
| 2015/0076379 | A1 | * | 3/2015 | Schuessler | .............. B60T 17/04 251/120 |

FOREIGN PATENT DOCUMENTS

CN    203718015 U    7/2014

OTHER PUBLICATIONS

International Search Report and Written Opinion of corresponding International Application No. PCT/US2015/015634; date of mailing: May 15, 2015; 6 pages.

* cited by examiner

*Primary Examiner* — R. K. Arundale
(74) *Attorney, Agent, or Firm* — Shumaker, Loop & Kendrick, LLP

(57) ABSTRACT

A relief valve for relieving pressure in a fluid conduit that includes a cradle positioned in the relief valve conduit and having a ball support surface and a ball mounted on the ball support surface and adapted for sealing against the valve seat of the pressure relief port. A spring support surface and a spring positioned in the pressure relief conduit urges the cradle and the ball into sealing position against the valve seat of the pressure relief port.

14 Claims, 6 Drawing Sheets

RELIEF VALVE

TECHNICAL FIELD AND BACKGROUND OF THE INVENTION

This application relates to a relief valve used to relieve pressure in a pressurized fluid system. The novel relief valve is described in this application for purposes of illustration and explanation as being installed on a water heater shutoff/thermal expansion control valve such as an Apollo® 78LF-RV Series valve manufactured by Conbraco Industries, Inc. of Matthews, N.C. However, the relief valve has application in a wide variety of uses, and its description in this application installed on a specific device carries no implication that its use is limited to use on that device.

Conventional relief valves include a body that is positioned in fluid communication with a pressurized fluid system, for example a shutoff valve, backflow valve, or pipe. A spring-loaded rubber ball bears against the walls of a relief port in the valve, pipe, etc. The spring is designed for a specific relief setting. If pressure in the system exceeds a predetermined value, that excessive pressure exerts sufficient force against the ball to unseat it from the relief port walls, allowing fluid to flow past the ball to atmosphere, an expansion tank or other reservoir. As the pressure is reduced, the ball is again urged back into sealing contact with the wall of the relief port. The spring is mounted in a conduit in the relief valve and is held in an aligned position by the walls of the conduit and a shoulder of reduced diameter against which the end of the spring remote from the ball resides. These prior art relief valves are prone to delivering inaccurate performance as a result of the spring being compressed during an over pressure event to the extent that the coils contact each other and the spring becomes, in practical effect, a solid object that restricts fluid flow from the valve. This condition can result in false pressure readings, delayed pressure relief and similar conditions.

SUMMARY OF THE INVENTION

Therefore, it is an object of the invention to provide a pressure relief valve that provides accurate, reliable and rapid pressure relief in a pressurized fluid system to which the relief valve is attached.

It is another object of the invention to provide a pressure relief valve that permits pressure relief by full fluid flow from a fluid system in an over pressure condition.

It is another object of the invention to provide a pressure relief valve that provides support to the sealing ball during both sealed and unsealed positions.

It is another object of the invention to provide a pressure relief valve that prevents deformation of the ball in both sealed and unsealed positions.

These and other objects and advantages of the present invention are achieved in the preferred embodiment disclosed below by providing a relief valve for relieving pressure in a fluid conduit that includes a valve body adapted for being positioned in fluid communication with a fluid pressure system. A relief valve conduit is formed in the relief valve body and has a valve seat positioned around a pressure relief port at one end of the conduit adapted for communication with the fluid pressure system and a discharge vent in an opposite end of the conduit. A cradle is positioned in the relief valve conduit and includes a ball support surface with a ball mounted on the ball support surface and adapted for sealing against the valve seat of the pressure relief port. A spring support surface is provided normal to a longitudinal axis of the relief valve conduit. The spring is positioned in the pressure relief conduit for urging the ball carried in the cradle into sealing position against the valve seat of the pressure relief port. The spring has a predetermined load. When pressure is exerted on the spring in excess of the predetermined load, the spring will compress, withdrawing the ball out of sealing position against the valve seat of the pressure relief port to allow a discharge of fluid from the fluid pressure system.

According to another embodiment of the invention, the cradle includes a pair of spacers positioned between the ball support surface and the spring support surface.

According to another embodiment of the invention, the cradle includes a pair of spacers positioned between the ball support surface and the spring support surface and at least one flow port for permitting fluid flow through and around the cradle.

According to another embodiment of the invention, the ball support surface of the cradle includes an annular segment corresponding in shape to a portion of the surface of the ball.

According to another embodiment of the invention, the spring support surface includes a planar surface defined by an inner and outer circumference of the cradle.

According to another embodiment of the invention, the relief valve conduit includes a shoulder of reduced diameter for supporting an end of the spring remote from the ball.

According to another embodiment of the invention, the ball is fabricated of ethylene propylene diene monomer.

According to another embodiment of the invention, the ball has a 70 Shore A hardness.

According to another embodiment of the invention, the spring has a compression of about 50 percent between a free length and a fully compressed length.

According to another embodiment of the invention, a relief valve is provided for relieving pressure in a fluid conduit, and includes a valve body adapted for being positioned in fluid communication with a fluid pressure system and a relief valve conduit formed in the relief valve body having a valve seat positioned around a pressure relief port at one end of the conduit adapted for communication with the fluid pressure system and a discharge vent in an opposite end of the conduit. A cradle is positioned in the relief valve conduit and includes a ball support surface and a ball mounted on the ball support surface adapted for sealing against the valve seat of the pressure relief port. The ball support surface of the cradle includes an annular segment corresponding in shape to a portion of the surface of the ball. A spring support surface normal to a longitudinal axis of the relief valve conduit has a planar defined by an inner and outer circumference. A spring is positioned in the pressure relief conduit for urging the cradle and the ball into sealing position against the valve seat of the pressure relief port. The spring has a predetermined load in excess of which the spring will compress, withdrawing the ball out of sealing position against the valve seat of the pressure relief port to allow a discharge of fluid from the fluid pressure system. A pair of spacers is positioned between the ball support surface and the spring support surface and at least one flow port for permitting fluid flow through and around the cradle. A shoulder of reduced diameter is formed in the relief valve conduit for supporting an end of the spring remote from the ball.

According to another embodiment of the invention, a water heater shutoff/thermal expansion control valve adapted for being positioned in flow communication with a water pressure system is provided, and includes a pressure relief valve for relieving pressure in the system above a predetermined level. The pressure relief valve includes a valve body adapted for being positioned in fluid communication with a fluid pressure system. A relief valve conduit is formed in the relief valve body and has a valve seat positioned around a pressure relief port at one end of the conduit adapted for communication with the fluid pressure system and a discharge vent in an opposite end of the conduit. A cradle is positioned in the relief valve conduit and includes a ball support surface and a ball mounted on the ball support surface and adapted for sealing against the valve seat of the pressure relief port. A spring support surface normal to a longitudinal axis of the relief valve conduit is provided, and a spring is positioned in the pressure relief conduit for urging the cradle and the ball into sealing position against the valve seat of the pressure relief port. The spring has a predetermined load in excess of which the spring will compress, withdrawing the ball out of sealing position against the valve seat of the pressure relief port to allow a discharge of fluid from the fluid pressure system.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1:
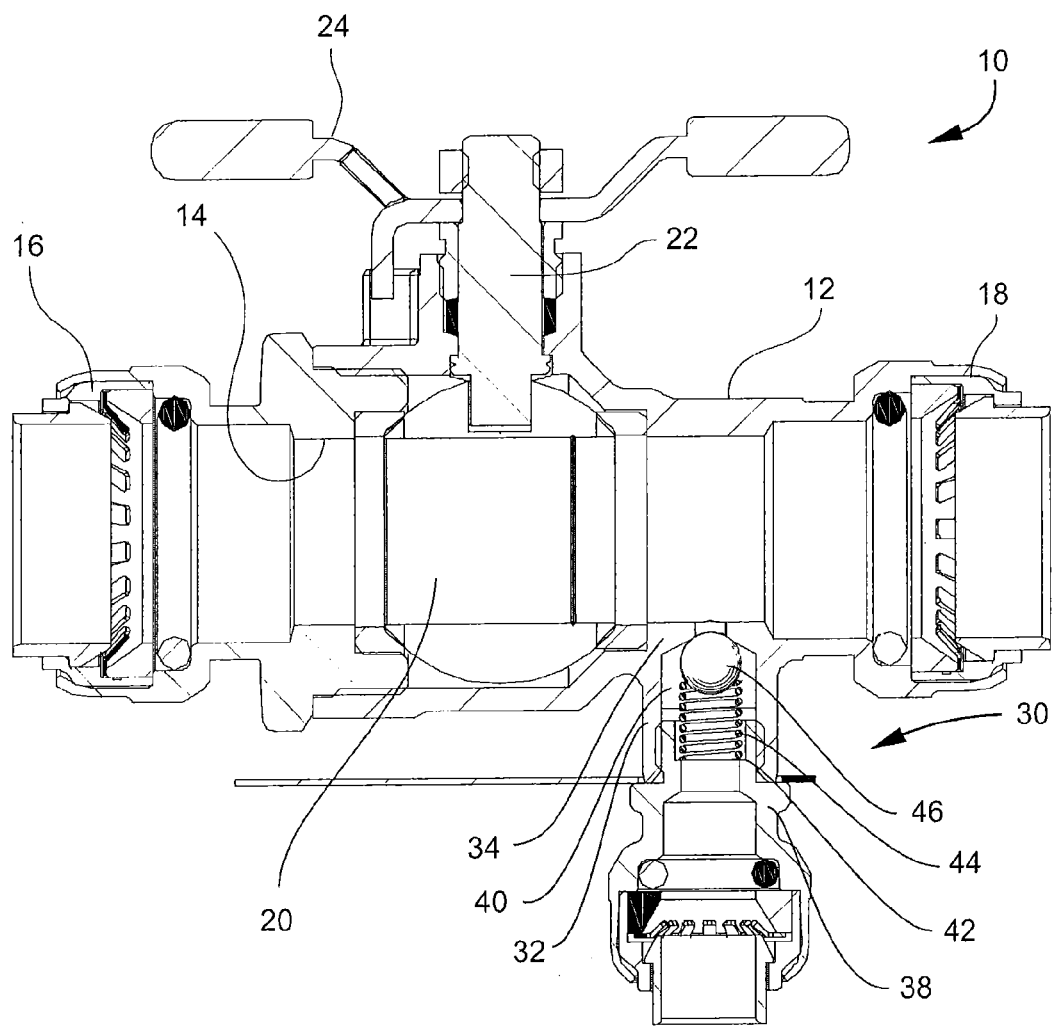
FIG. 1 is a vertical longitudinal cross section of a water heater shutoff/thermal expansion control valve equipped with a prior art pressure relief valve.
Figure 2:
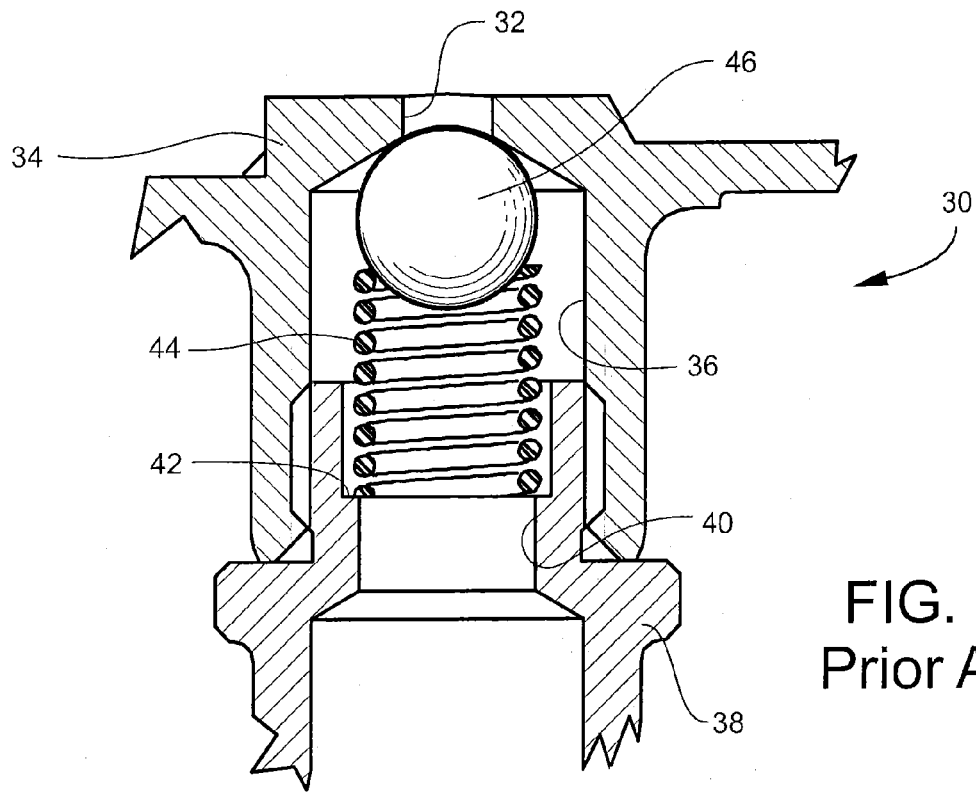
FIG. 2 is a vertical longitudinal cross section of the prior art pressure relief valve of FIG. 1 in a sealing position.
Figure 3:
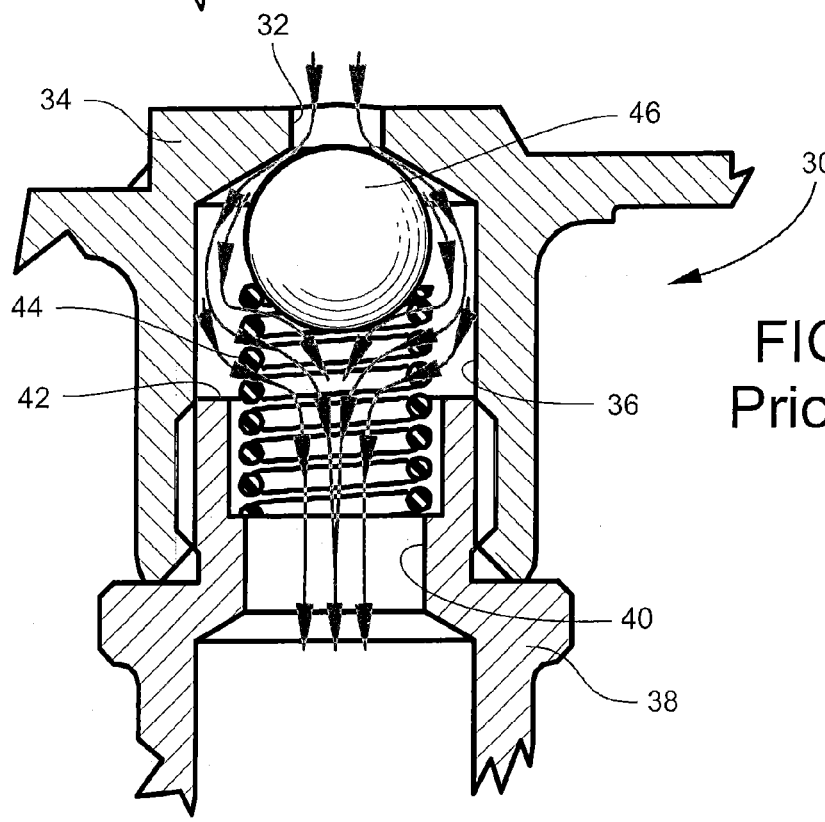
FIG. 3 is a vertical longitudinal cross section of the prior art pressure relief valve of FIG. 1 in an unsealed, pressure relief position.
Figure 4:
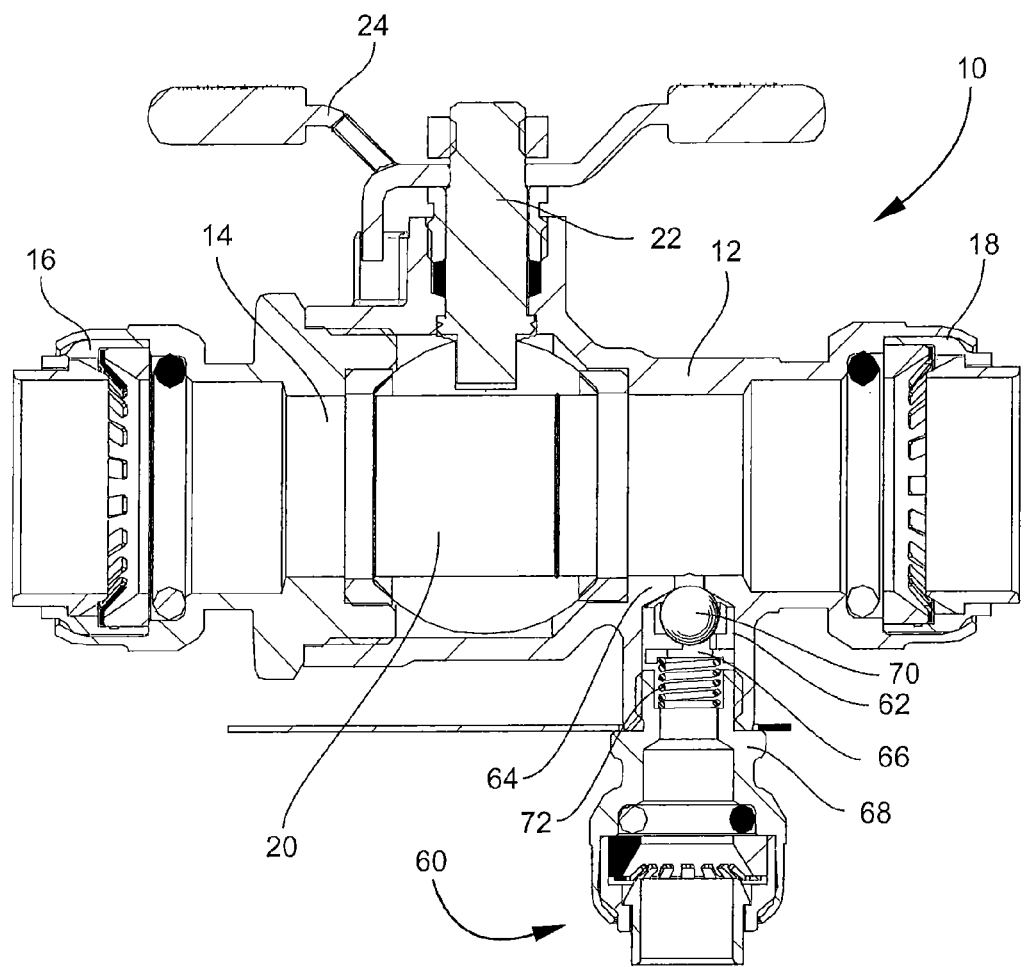
FIG. 4 is a vertical longitudinal cross section of a water heater shutoff/thermal expansion control valve equipped with a pressure relief valve according to a preferred embodiment of the invention.
Figure 5:
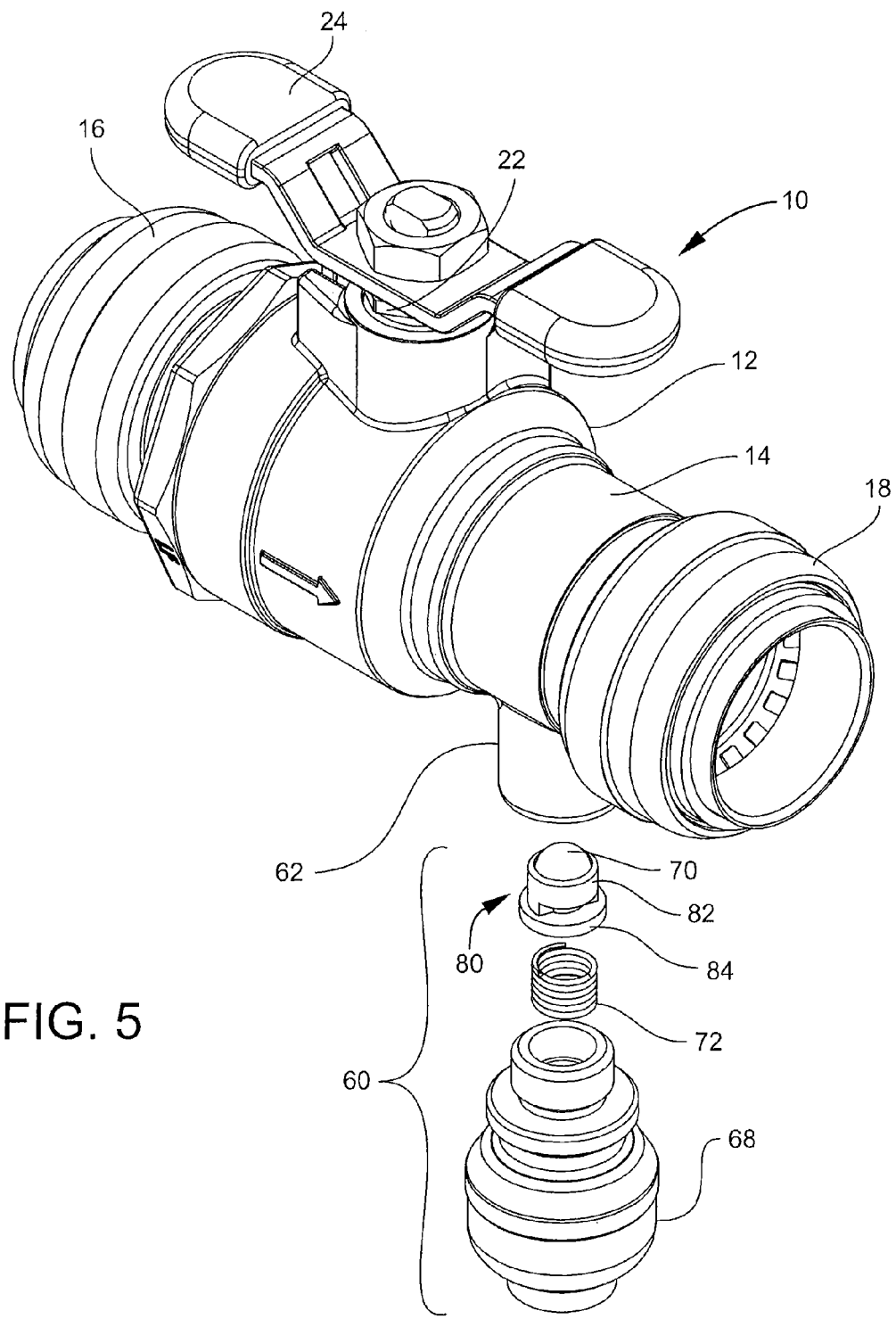
FIG. 5 is a side elevation view of the water heater shutoff/thermal expansion control valve of FIG. 4, with the components of the pressure relief valve shown in an exploded view.

Referring now to FIGS. 1, 2 and 3 of the application, a water heater shutoff/thermal expansion control valve 10 is shown, and includes a valve body 12 defining a conduit 14 that passes water from a supply connection 16 through the conduit 14 and out through a discharge connection 18 to, for example, a water heater. Valve 10 is controlled by a valve ball 20 rotated by a stem 22 connected to a quarter-turn handle 24.

A prior art relief valve 30 includes a valve body 32 that communicates with the conduit 14 through a chamfered relief port 34 in the valve body 12. The valve body 32 defines a relief valve conduit 36 that vents fluid to atmosphere or a suitable reservoir. A relief valve fitting sub-assembly 38 is threaded onto the valve body 32 of the relief valve 30. The valve body 32 defines a conduit 40 with a shoulder 42 that supports a spring 44 that directly contacts and urges a ball 46 against the relief port 34 to effect a seal during normal pressure operation of the valve 10. See FIG. 2.

This design presents several disadvantages. First, rapid, accurate discharge is obstructed by the coils of the spring 44 as water is vented to the atmosphere, as shown in FIG. 3. Delay in venting may result in a false reading of the discharge rate that fails to satisfy the performance requirements of IAPMO IGC 128-2008. Second, the ball 46 is seated directly on the top of spring 44. The pressure of the spring 44 against the ball 46 can cause an impression on the surface of the ball 46 and, eventually damage to the surface. As the spring 44 impresses itself into the surface of the ball 46, the in-place length of the spring increases and reduces the load applied to the ball 46 as the impression on the surface of the ball 46 increases.

Referring now to FIGS. 4-9, a relief valve 60 according to the invention is shown in place on a valve 10 of the same design and operation as the valve 10 of FIGS. 1-3. Relief valve 60 includes a valve body 62 that communicates with the conduit 14 through a chamfered relief port 64 in the valve body 12. The relief valve body 62 defines a relief valve conduit 66 that vents fluid to atmosphere or a suitable reservoir. A relief valve fitting sub-assembly 68 is threaded onto the valve body 62 of the relief valve 60. See FIGS. 5, 6 and 7.

Figure 8:
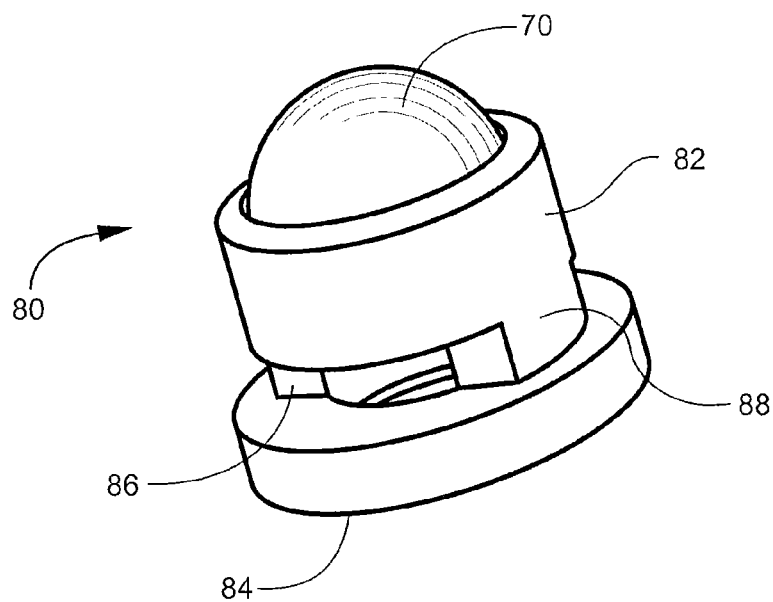
FIG. 8 is an enlarged view of the ball and spring support cradle of the invention.
Figure 9:
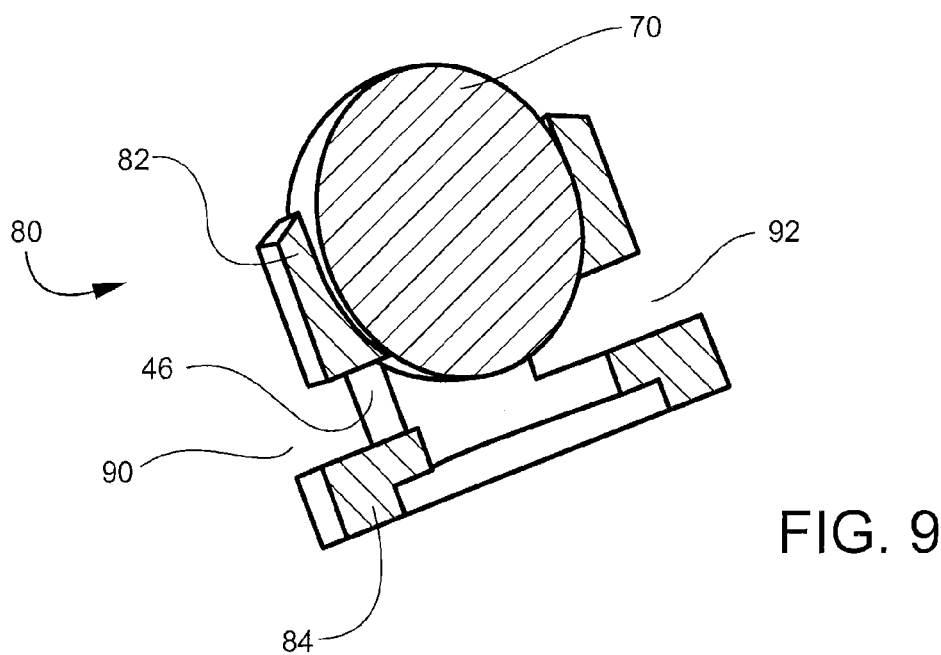
FIG. 9 is a cross-section of the ball and spring support cradle shown in FIG. 8.

A ball 70 and spring 72 operate the relief valve 60, and as is shown in FIGS. 8 and 9, in accordance with the invention, a cradle 80 is provided and includes an annular ball support surface 82 and a ring-shaped, radially-extending spring support surface 84. The ball support surface 82 and spring support surface 84 are separated by a pair of spacers 86, 88 that define flow ports 90, 92.

Figure 6:
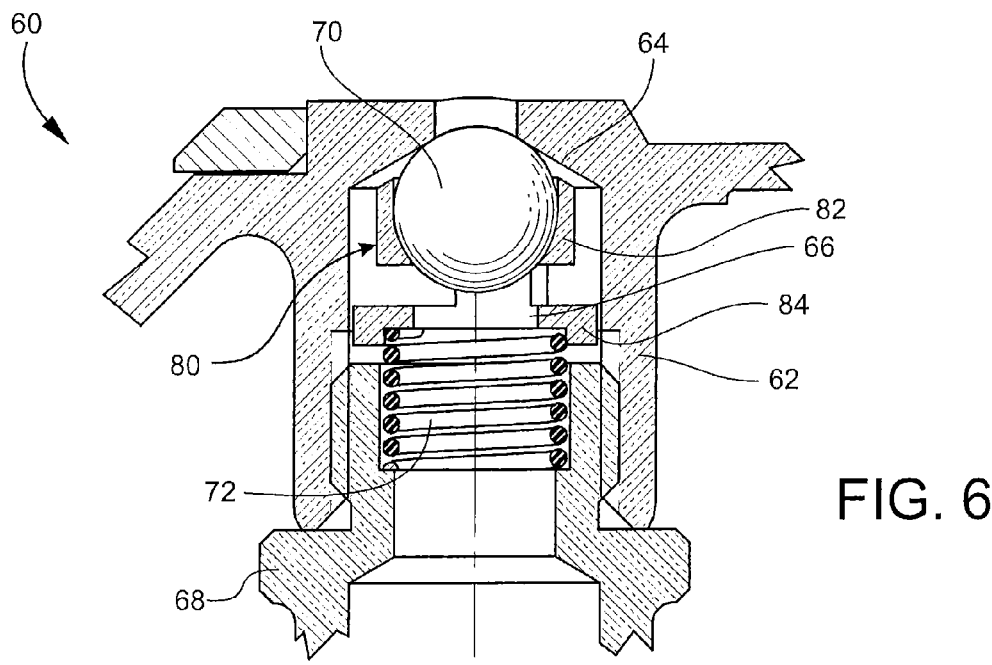
FIG. 6 is a vertical longitudinal cross section of the pressure relief valve of FIG. 4 in a sealing position.
Figure 7:
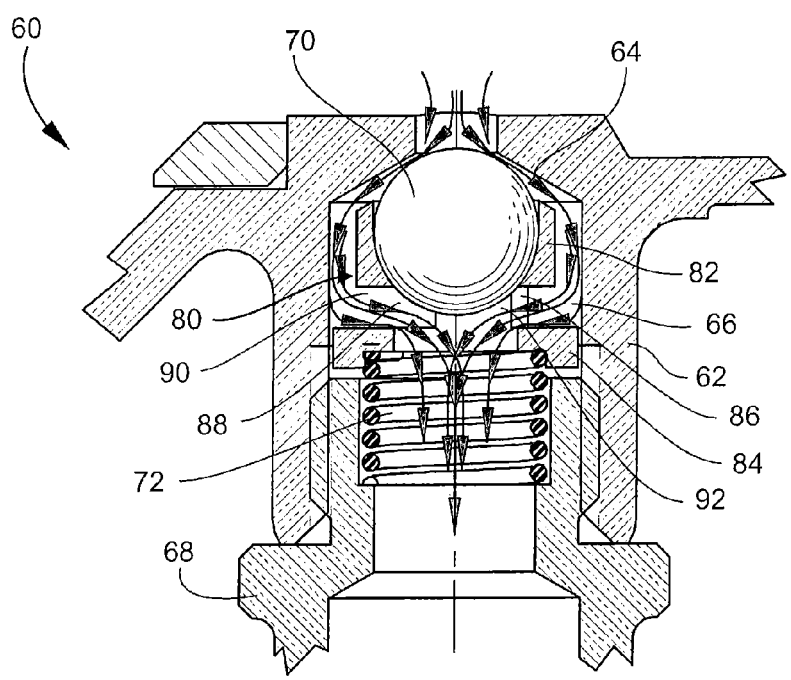
FIG. 7 is a vertical longitudinal cross section of the pressure relief valve of FIG. 4 in an unsealed, pressure relief position.

Referring now to FIGS. 6 and 7, the spring 72 now engages the spring support surface 84 of the cradle 80 instead of the ball 70. The ball 70 is supported on the much larger surface area of the ball support surface 82. The ball 70 is uniformly urged against the relief port 64 by operation of the spring support surface 84. The ball 80 is preferably EPDM rubber (ethylene propylene diene monomer) with a 70 Shore A hardness. EPDM is a particularly appropriate material because of its resistance to softening and degradation by hot water. In one embodiment, the ball has a diameter of 0.250 in. (6.35 mm), the spring has a 0.390 in. (9 mm) free length and a 0.213 in. (5.4 mm) compressed length. The ball support surface 82 has a radius of 0.125 in. (3.18 mm), and the spring support surface has an inner circumference of 0.260 in. (6.6 mm) and an outer circumference of 370 in. (9.4 mm).

A relief valve is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A relief valve for relieving pressure in a fluid conduit, comprising:
(a) a valve body adapted for being positioned in fluid communication with a fluid pressure system;

(b) a relief valve conduit formed in the relief valve body and having a valve seat positioned around a pressure relief port at one end of the conduit adapted for communication with the fluid pressure system and a discharge vent in an opposite end of the conduit;
(c) a cradle positioned in the relief valve conduit and including:
  (I) a ball support surface and a ball mounted on the ball support surface and adapted for sealing against the valve seat of the pressure relief port; and
  (ii) a spring support surface normal to a longitudinal axis of the relief valve conduit and a spring positioned in the pressure relief conduit for urging the cradle and the ball into sealing position against the valve seat of the pressure relief port, the spring having a predetermined load in excess of which the spring will compress, withdrawing the ball out of sealing position against the valve seat of the pressure relief port to allow a discharge of fluid from the fluid pressure system, wherein:
    the cradle includes a pair of spacers positioned between the ball support surface and the spring support surface and at least one flow port for permitting fluid flow through and around the cradle.

2. A relief valve according to claim 1, wherein the ball support surface of the cradle includes an annular segment corresponding in shape to a portion of the surface of the ball.

3. A relief valve according to claim 1, wherein the spring support surface comprises a planar surface defined by an inner and outer circumference of the cradle.

4. A relief valve according to claim 1, wherein the relief valve conduit includes a shoulder of reduced diameter for supporting an end of the spring remote from the ball.

5. A relief valve according to claim 1, wherein the ball comprises ethylene propylene diene monomer.

6. A relief valve according to claim 5, wherein the ball has a 70 Shore A hardness.

7. A relief valve according to claim 1, wherein the spring has a compression of about 50 percent between a free length and a fully compressed length.

8. A relief valve for relieving pressure in a fluid conduit, comprising:
(a) a valve body adapted for being positioned in fluid communication with a fluid pressure system;
(b) a relief valve conduit formed in the relief valve body and having a valve seat positioned around a pressure relief port at one end of the conduit adapted for communication with the fluid pressure system and a discharge vent in an opposite end of the conduit;
(c) a cradle positioned in the relief valve conduit and including:
  (I) a ball support surface and a ball mounted on the ball support surface and adapted for sealing against the valve seat of the pressure relief port, the ball support surface of the cradle including an annular segment corresponding in shape to a portion of the surface of the ball;
  (ii) a spring support surface normal to a longitudinal axis of the relief valve conduit having a planar surface defined by an inner and outer circumference of the cradle, and a spring positioned in the pressure relief conduit for urging the cradle and the ball into sealing position against the valve seat of the pressure relief port, the spring having a predetermined load in excess of which the spring will compress, withdrawing the ball out of sealing position against the valve seat of the pressure relief port to allow a discharge of fluid from the fluid pressure system;
  (iii) a pair of spacers positioned between the ball support surface and the spring support surface and at least one flow port for permitting fluid flow through and around the cradle; and
(d) a shoulder of reduced diameter formed in the relief valve conduit for supporting an end of the spring remote from the ball.

9. A water heater shutoff/thermal expansion control valve adapted for being positioned in flow communication with a water pressure system, and including pressure relief valve for relieving pressure in the system above a predetermined level, the pressure relief valve comprising:
(a) a valve body adapted for being positioned in fluid communication with a fluid pressure system;
(b) a relief valve conduit formed in the relief valve body and having a valve seat positioned around a pressure relief port at one end of the conduit adapted for communication with the fluid pressure system and a discharge vent in an opposite end of the conduit;
(c) a cradle positioned in the relief valve conduit and including:
  (I) a ball support surface and a ball mounted on the ball support surface and adapted for sealing against the valve seat of the pressure relief port; and
  (ii) a spring support surface normal to a longitudinal axis of the relief valve conduit and a spring positioned in the pressure relief conduit for urging the cradle and the ball into sealing position against the valve seat of the pressure relief port, the spring having a predetermined load in excess of which the spring will compress, withdrawing the ball out of sealing position against the valve seat of the pressure relief port to allow a discharge of fluid from the fluid pressure system, wherein:
    the cradle includes a pair of spacers positioned between the ball support surface and the spring support surface and at least one flow port for permitting fluid flow through and around the cradle.

10. A water heater shutoff/thermal expansion control valve according to claim 9, wherein the ball support surface of the cradle includes an annular segment corresponding in shape to a portion of the surface of the ball.

11. A water heater shutoff/thermal expansion control valve according to claim 9, wherein the spring support surface comprises a planar surface defined by an inner and outer circumference of the cradle.

12. A water heater shutoff/thermal expansion control valve according to claim 9, wherein the relief valve conduit includes a shoulder of reduced diameter for supporting an end of the spring remote from the ball.

13. A water heater shutoff/thermal expansion control valve according to claim 9, wherein the ball comprises ethylene propylene diene monomer.

14. A water heater shutoff/thermal expansion control valve according to claim 13, wherein the ball has a 70 Shore A hardness.

* * * * *